(12) United States Patent
Hara et al.

(10) Patent No.: US 11,022,763 B2
(45) Date of Patent: Jun. 1, 2021

(54) OPTICAL MODULE

(71) Applicant: Sumitomo Osaka Cement Co., Ltd., Tokyo (JP)

(72) Inventors: Tokutaka Hara, Tokyo (JP); Kei Katou, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 16/364,603

(22) Filed: Mar. 26, 2019

(65) Prior Publication Data
US 2019/0302378 A1 Oct. 3, 2019

(30) Foreign Application Priority Data

Mar. 30, 2018 (JP) .............................. JP2018-066564

(51) Int. Cl.
*G02B 6/42* (2006.01)
*G02B 6/26* (2006.01)
*G02B 6/36* (2006.01)
*G02B 7/10* (2021.01)
*G02B 5/18* (2006.01)

(52) U.S. Cl.
CPC ......... *G02B 6/4204* (2013.01); *G02B 5/1876* (2013.01); *G02B 6/26* (2013.01); *G02B 6/36* (2013.01); *G02B 6/4292* (2013.01); *G02B 7/10* (2013.01)

(58) Field of Classification Search
None
See application file for complete search history.

(56) References Cited

U.S. PATENT DOCUMENTS

| 2001/0039126 | A1* | 11/2001 | Ebinuma | ............. | G03F 7/70825 438/795 |
| 2002/0018627 | A1* | 2/2002 | Kato | ................... | H01S 5/02216 385/93 |
| 2006/0056780 | A1* | 3/2006 | Takai | ................... | G02B 6/4201 385/92 |
| 2008/0239270 | A1* | 10/2008 | Bischoff | ................ | G02B 7/008 355/67 |

FOREIGN PATENT DOCUMENTS

JP 6107319 B2 4/2017

* cited by examiner

*Primary Examiner* — Chris H Chu
(74) *Attorney, Agent, or Firm* — IpHorgan Ltd.

(57) ABSTRACT

An optical module in which an optical element is housed in a housing includes: an optical window member through which input light to the optical element or output light from the optical element passes and which hermetically seals inside of the housing; and a holding member that holds the optical window member. The optical window member is fixed to the housing by the holding member. A difference between linear expansion coefficients of the holding member and the optical window member is smaller than a difference between linear expansion coefficients of the housing and the optical window member. A position where the optical window member is attached on the holding member protrudes to an optical element side from a position where the holding member itself is fixed.

2 Claims, 3 Drawing Sheets

OPTICAL MODULE

BACKGROUND OF THE INVENTION

Field of the Invention

The present invention relates to an optical module, and in particular to an optical module in which an optical element is housed in a housing and which includes an optical window member, through which input light to the optical element or output light from the optical element passes and which hermetically seals the inside of the housing.

Description of Related Art

In the optical communication field or the optical measurement field, an optical module in which an optical element, such as an optical modulation element, is housed in a housing is used.

At the time of introducing input light to the optical element housed in the housing or extracting output light from the optical element housed in the housing, a through-hole is formed in a part of the housing, and an optical window member which hermetically seals the through-hole and through which the input light or the output light can pass is disposed.

In an optical module in the related art disclosed in Japanese Patent No. 6107319, as shown in FIG. 1, an optical window member 3 for taking out signal light from a housing 1 in which an optical modulation element 2 is housed is attached to the housing, and a metal pedestal 5 for mounting a lens 4 for an optical collimator is provided in the vicinity of the optical window member 3. Reference numeral 6 denotes an optical fiber for transmitting signal light from the lens 4.

However, in a case where the environmental temperature changes, a difference in linear expansion occurs between the housing 1 including a metal, such as JIS-SUS303, and the optical window member 3 including a sapphire substrate. Accordingly, there has been a problem, such as damage to the optical window member with low strength.

In order to solve this problem, it has been proposed to provide an interposing member, such as a holder for holding the optical window member, between the housing and the optical window member, as disclosed in paragraph 0021 of Japanese Patent No. 6107319. In addition, it has been proposed to set the linear expansion coefficient of the interposing member to a linear expansion coefficient between the constituent material of the housing and the constituent material of the optical window member.

FIG. 2 shows a state in which the optical window member 3 is held by a holding member 7, such as a holder, and the holding member 7 is fixed to the housing 1. Here, as the holding member 7, a metal having a low linear expansion coefficient, such as Kovar, is used.

By further combining the lens 4 for an optical collimator with the configuration shown in FIG. 2, a configuration shown in FIG. 3 is obtained. Since a lens barrel 40 in which the lens 4 is housed and the pedestal 5 are bonded to each other by YAG laser welding, a predetermined thickness is required. For this reason, it is not possible to reduce the thickness of a portion where the pedestal 5 and the lens barrel 40 are in contact with each other. In addition, in order to secure a space for arranging the holding member 7 inside the pedestal 5, the pedestal 5 further protrudes to the outside of the housing.

In a case where the holding member 7 is disposed as shown in FIG. 3, the size of the pedestal 5 also increases due to the influence of the holding member. As a result, there is a problem that the size of the entire optical module increases.

SUMMARY OF THE INVENTION

In order to solve the aforementioned problem, it is an object of the invention to provide an optical module capable of suppressing damage to an optical window member due to a change in environmental temperature while suppressing an increase in the size of the optical module.

In order to solve the aforementioned problem, an optical module of the invention has the following technical features.

(1) An optical module in which an optical element is housed in a housing includes: an optical window member through which input light to the optical element or output light from the optical element passes and which hermetically seals inside of the housing; and a holding member that holds the optical window member. The optical window member is fixed to the housing by the holding member. A difference between linear expansion coefficients of the holding member and the optical window member is smaller than a difference between linear expansion coefficients of the housing and the optical window member. A position where the optical window member is attached on the holding member protrudes to an optical element side from a position where the holding member itself is fixed.

(2) The optical module described in the above-described (1) further includes a lens barrel which is provided outside the housing and in which a lens for condensing the input light or the output light is housed. The lens barrel is fixed to the housing by a pedestal.

(3) In the optical module described in the above-described (2), the holding member is fixed to the pedestal.

According to the invention, an optical module in which an optical element is housed in a housing includes: an optical window member through which input light to the optical element or output light from the optical element passes and which hermetically seals inside of the housing; and a holding member that holds the optical window member. The optical window member is fixed to the housing by the holding member, a difference between linear expansion coefficients of the holding member and the optical window member is smaller than a difference between linear expansion coefficients of the housing and the optical window member, and a position where the optical window member is attached on the holding member protrudes to an optical element side from a position where the holding member itself is fixed. Therefore, since the holding member is restrained from protruding to the outside of the housing, it is possible to suppress an increase in the size of the entire optical module. In addition, due to the linear expansion coefficient of the holding member, damage to the optical window member due to linear expansion of the housing is also suppressed.

DETAILED DESCRIPTION OF THE INVENTION

Hereinafter, an optical module of the invention will be described in detail using preferred examples.

Figure 1:
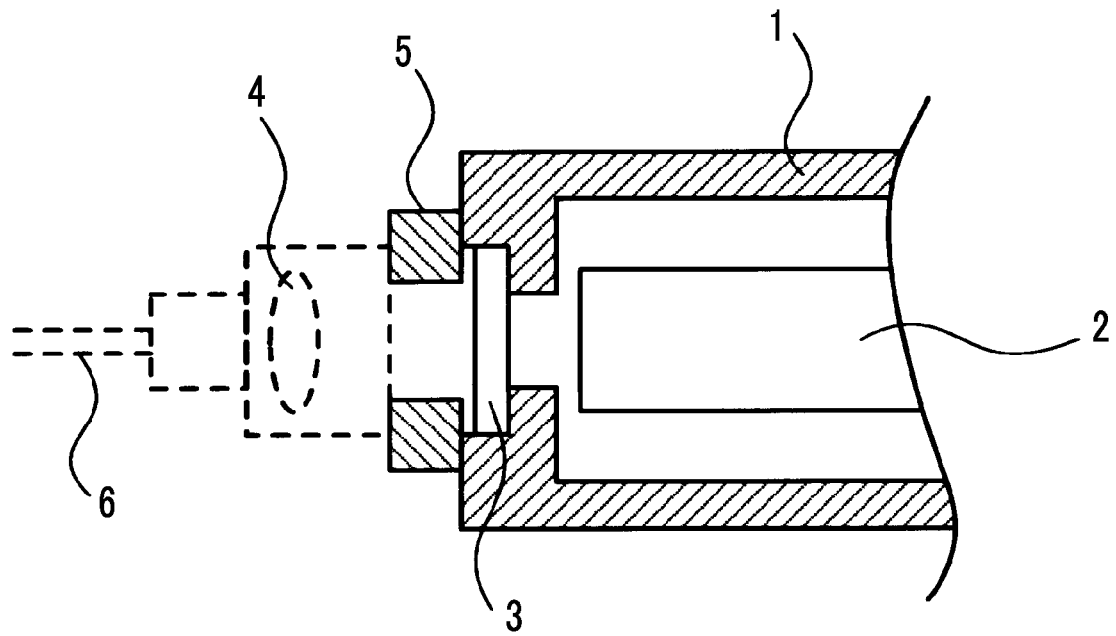
FIG. 1 is a plan view showing an outline of an optical module in the related art.
Figure 2:
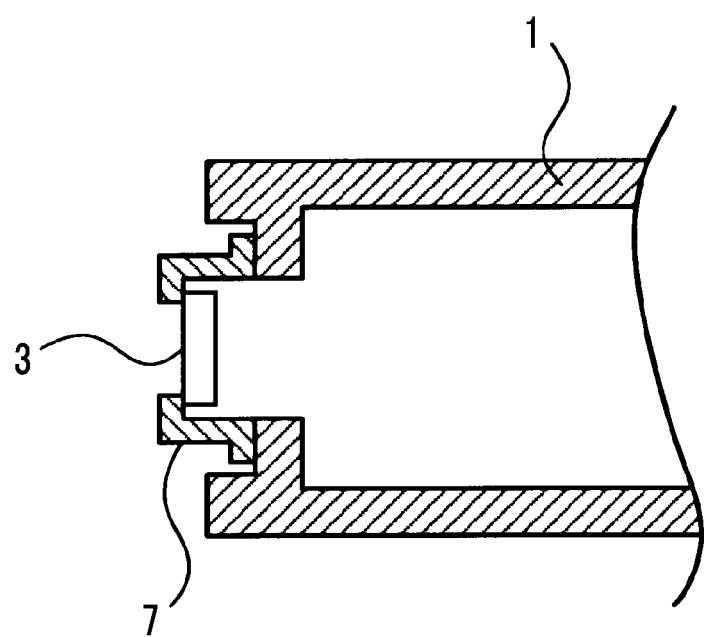
FIG. 2 is a plan view showing an outline of an optical module in the related art including a holding member that holds an optical window member.
Figure 3:
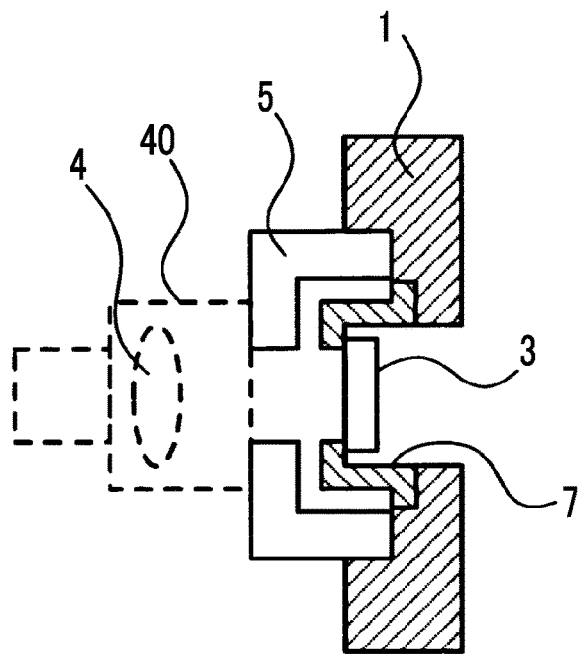
FIG. 3 is a plan view showing an outline in a case where a lens barrel for an optical collimator is disposed in the optical module in the related art shown in FIG. 2.
Figure 4:
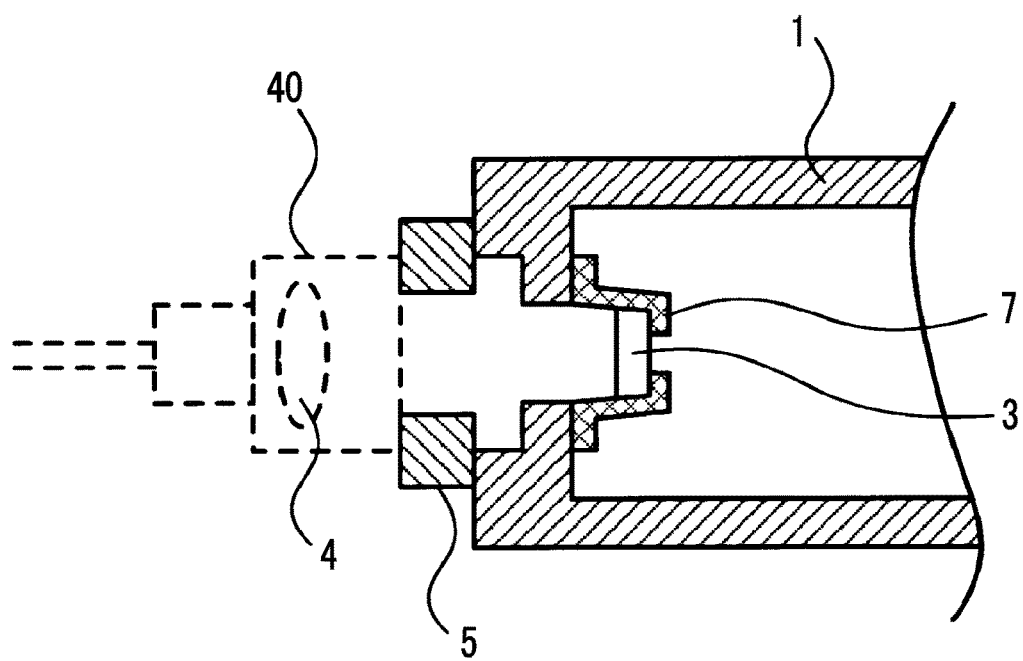
FIG. 4 is a plan view showing a first embodiment of an optical module of the invention.
Figure 5:
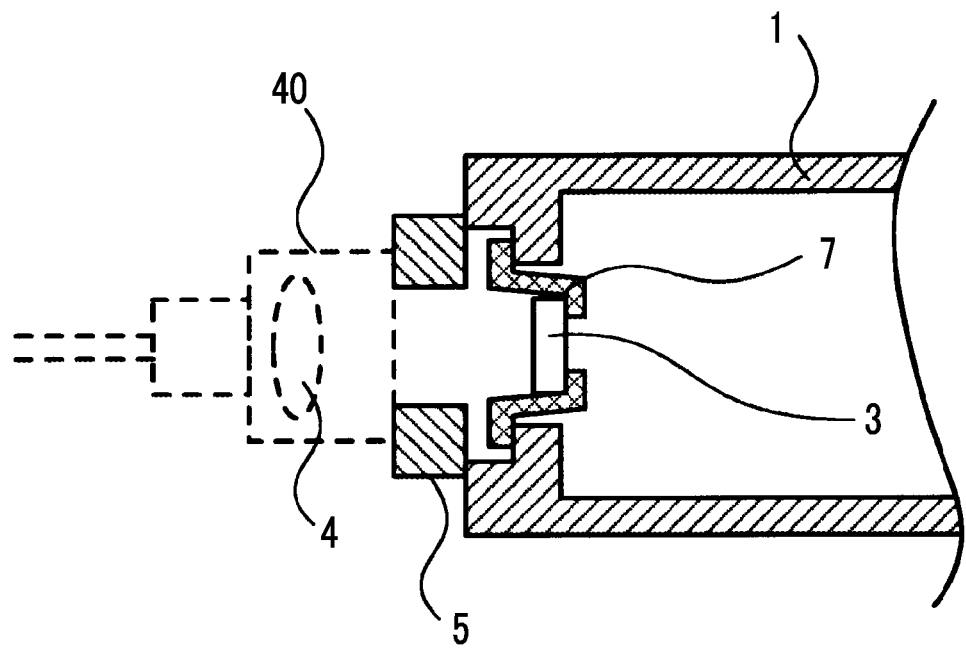
FIG. 5 is a plan view showing a second embodiment of the optical module of the invention.
Figure 6:
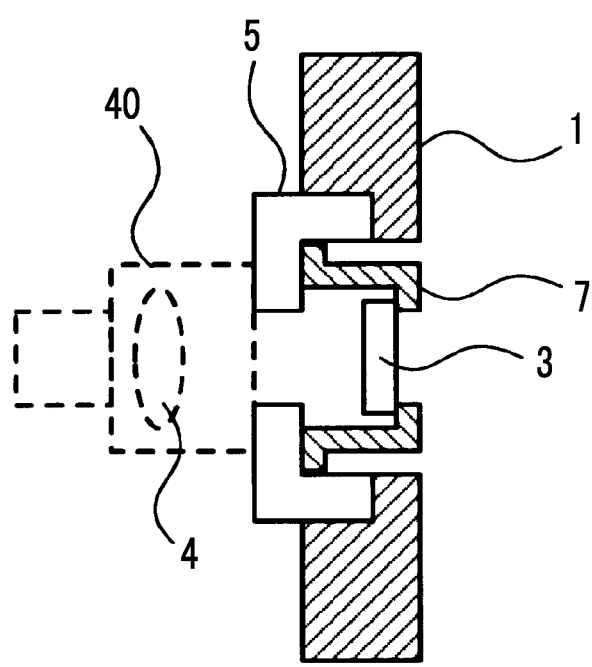
FIG. 6 is a plan view showing a third embodiment of the optical module of the invention.

As shown in FIGS. 4 to 6, an optical module of the invention is an optical module in which an optical element (not shown) is housed in a housing 1 and which includes an optical window member 3, through which input light to the optical element or output light from the optical element passes and which hermetically seals the inside of the housing. The optical module of the invention is characterized in that a holding member 7 for holding the optical window member 3 is provided, the optical window member is fixed to the housing by the holding member, a difference between the linear expansion coefficients of the holding member and the optical window member is smaller than a difference between the linear expansion coefficients of the housing and the optical window member, and a position where the optical window member is attached on the holding member protrudes to the optical element side from a position where the holding member itself is fixed.

FIG. 4 is a diagram for explaining a first embodiment of the optical module of the invention. In the first embodiment, the holding member 7 that holds the optical window member 3 is adhered and fixed to the inner wall of the housing 1. In the optical module of the invention, a lens housing 40 in which a lens 4 for an optical collimator is housed is disposed so as to be fixed to the housing 1 by the pedestal 5, and a part of the holding member 7 is configured so as not to protrude from the position of the bonding surface between the housing 1 and the pedestal 5 to the pedestal side. Therefore, since the thickness of the pedestal 5 in the optical axis direction can be a minimum thickness at which the lens housing 40 can be stably fixed, it is possible to suppress an increase in the size of the optical module.

In the optical module of the invention, a transparent substrate such as sapphire is used as the optical window member 3. For the holding member 7 that holds the optical window member 3, Kovar (alloy of iron, nickel, and cobalt) or the like that is a material (usually, a metal material such as JIS-SUS303 and JIS-SUS304 is used) whose linear expansion coefficient is closer to that of the optical window member than that of the material forming the housing 1 is used. Therefore, since the difference between the linear expansion coefficients of the holding member and the optical window member can be made smaller than the difference between the linear expansion coefficients of the housing and the optical window member in the related art, it is possible to prevent damage to the optical window member and the like due to stress distortion generated between the holding member and the optical window member even in a case where the environmental temperature changes.

In addition, although the thickness of the holding member depends on the material, it is preferable to have a thickness of 1 mm or more in the case of Kovar in order to obtain an effect of reducing the impact on the optical window member or the mechanical stress. Since the thickness of such a holding member also affects the increase in the size of the optical module, a study regarding a structure for fixing a holding member, such as that described in a second or third embodiment to be described later, is also required.

In the first embodiment shown in FIG. 4, the holding member 7 protrudes largely into the housing. Therefore, it is necessary to increase the size of the housing itself by the protruding amount. As a method of solving this problem, it is also possible to fix the holding member 7 to the housing 1 from the outside of the housing 1 as in the second embodiment of FIG. 5.

In the second embodiment of FIG. 5, a through-hole is formed in the holding member 7, and the optical window member 3 is fixed to one end of the through-hole. The holding member 7 is fixed to a recess formed outside the housing with solder or the like so that the optical window member 3 is inside the housing. In addition, the pedestal 5 for fixing the lens housing 40 is separated from the fixing portion of the holding member 7 and fixed to the housing 1 by YAG laser welding or the like. With such a configuration, since the holding member 7 is restrained from protruding to the outside of the housing 1, it is possible to suppress an increase in the size of the entire optical module.

Next, FIG. 6 shows the configuration of the third embodiment. In the configuration of the second embodiment shown in FIG. 5, the holding member 7 is fixed to the recess formed outside the housing so that the optical window member 3 is inside the housing. The configuration of the third embodiment shown in FIG. 6 is the same as the configuration of the second embodiment shown in FIG. 5 in that the holding member 7 is disposed so that the optical window member 3 fixed to the holding member 7 is inside the housing, but is different from the configuration of the second embodiment shown in FIG. 5 in that the holding member 7 is fixed to the housing side surface of the pedestal 5 that holds the lens barrel 40.

As an assembling method of such an optical module, for example, the optical window member 3 is first attached to the holding member 7, and then the holding member 7 is bonded to the pedestal 5. Finally, by bonding the pedestal 5 to the housing 1, the optical window member 3 can be disposed at a predetermined position of the housing 1. It is needless to say that the working procedure does not depend on such order.

The advantage of the third embodiment is that it is not necessary to separate the pedestal 5 from the fixing portion of the holding member 7 as shown in FIG. 5 since the bonding portion of the holding member 7 can be disposed on the back surface of the pedestal 5, and accordingly, the amount by which the holding member 7 protrudes toward the inside of the housing 1 can be reduced as much as possible. In addition, the linear expansion direction of the pedestal portion is the left direction in FIG. 6, whereas the linear expansion direction of the holding member 7 is the right direction in FIG. 6. Therefore, the amount of displacement of the optical window member 3 with respect to the housing 1 can be reduced as compared with the first and second embodiments. As a result, it is possible to suppress a change in the optical characteristics of the optical module according to the temperature change.

In addition, in such a configuration, in a case where the linear expansion coefficient of the pedestal 5 is larger than the linear expansion coefficient of the holding member 7, protruding of the holding member 7 to the inside of the housing 1 is suppressed. Therefore, since it is possible to effectively use the space inside the housing 1, it is possible to reduce the size of the optical module.

As described above, according to the invention, it is possible to provide an optical module capable of suppressing damage to an optical window member due to a change in ambient temperature while suppressing an increase in the size of the optical module.

What is claimed is:

1. An optical module in which an optical element is housed in a housing, comprising:
    an optical window through which input light from outside of the housing to the optical element or output light from the optical element to outside of the housing passes and which hermetically seals inside of the housing,
    a holding member that holds the optical window,
    a lens barrel which is provided outside the housing and in which a lens for condensing the input light or the output light is housed,
    a pedestal by which the lens barrel is fixed to the housing,
    wherein a material forming the holding member is different from a material forming the housing,
    a difference between linear expansion coefficients of the holding member and the optical window is smaller than a difference between linear expansion coefficients of the housing and the optical window,
    the holding member is fixed to the pedestal,
    a position where the pedestal is fixed to the housing is closer to the optical element side than a position where the holding member is fixed to the pedestal, and
    a position where the optical window is attached on the holding member protrudes to an optical element side from the position where the holding member is fixed to the pedestal.

2. The optical module according to claim 1, wherein a linear expansion coefficient of the pedestal is larger than a liner expansion coefficient of the holding member.

* * * * *